(12) United States Patent
Takamatsu

(10) Patent No.: US 6,533,328 B2
(45) Date of Patent: Mar. 18, 2003

(54) JOINT FOR DUPLEX PIPES

(75) Inventor: Yoshikazu Takamatsu, Tokyo (JP)

(73) Assignee: Calsonic Kansei Corporation, Tokyo (JP)

(*) Notice: Subject to any disclaimer, the term of this patent is extended or adjusted under 35 U.S.C. 154(b) by 100 days.

(21) Appl. No.: 09/790,869

(22) Filed: Feb. 23, 2001

(65) Prior Publication Data

US 2001/0019208 A1 Sep. 6, 2001

(30) Foreign Application Priority Data

Feb. 24, 2000 (JP) ........................................ 2000-047529

(51) Int. Cl.[7] ................................................ F16L 39/00
(52) U.S. Cl. .............................. 285/123.15; 285/123.1
(58) Field of Search .................... 285/123.15, 120.1, 285/123.1, 123.16, 123.17

(56) References Cited

U.S. PATENT DOCUMENTS

| | | | | |
|---|---|---|---|---|
| 2,838,074 A | * | 6/1958 | Lauck | 285/123.1 |
| 2,850,264 A | * | 9/1958 | Grable | 285/123.1 |
| 4,070,043 A | | 1/1978 | Becker | 285/133 A |
| 4,108,476 A | * | 8/1978 | Krupp | 285/123.1 |
| 4,128,127 A | | 12/1978 | Taylor | 166/105 |
| 4,708,371 A | * | 11/1987 | Elsworth et al. | 285/120.1 |
| 4,796,924 A | * | 1/1989 | Kosugi et al. | 285/123.1 |
| 4,890,865 A | * | 1/1990 | Hosono et al. | 285/123.15 |
| 5,011,193 A | * | 4/1991 | Porte | 285/123.1 |
| 5,088,774 A | | 2/1992 | Spiegelman | 285/133.1 |
| 5,184,850 A | * | 2/1993 | Wermelinger | 285/123.1 |
| 5,265,652 A | | 11/1993 | Brunella | 141/59 |
| 5,401,064 A | * | 3/1995 | Guest | 285/123.1 |
| 5,547,231 A | | 8/1996 | Sharp | 285/133.1 |
| 5,931,184 A | * | 8/1999 | Armenia et al. | 137/312 |
| 6,196,596 B1 | * | 3/2001 | Kwok et al. | 285/123.1 |

FOREIGN PATENT DOCUMENTS

| | | | | |
|---|---|---|---|---|
| CA | 672802 | * | 10/1963 | 285/FOR 120 |
| FR | 2 702 241 | | 9/1994 | E21B/17/18 |
| GB | 1 310 513 | | 3/1973 | F16L/39/04 |

* cited by examiner

*Primary Examiner*—Eric K. Nicholson
(74) *Attorney, Agent, or Firm*—Sughrue Mion, PLLC

(57) ABSTRACT

In the joint 40 for duplex pipes, a clearance between the first outer pipe seal unit 110 and the second outer pipe seal unit 210 is defined larger than a clearance existing between the first inner seal portion 120 and the second inner pipe seal unit 220. Furthermore, the wire diameter of the O-ring 301 which functions as the sealing member for the outer pipe is defined larger than the wire diameter of the O-ring 401 which functions as the sealing member for the inner pipe.

11 Claims, 6 Drawing Sheets

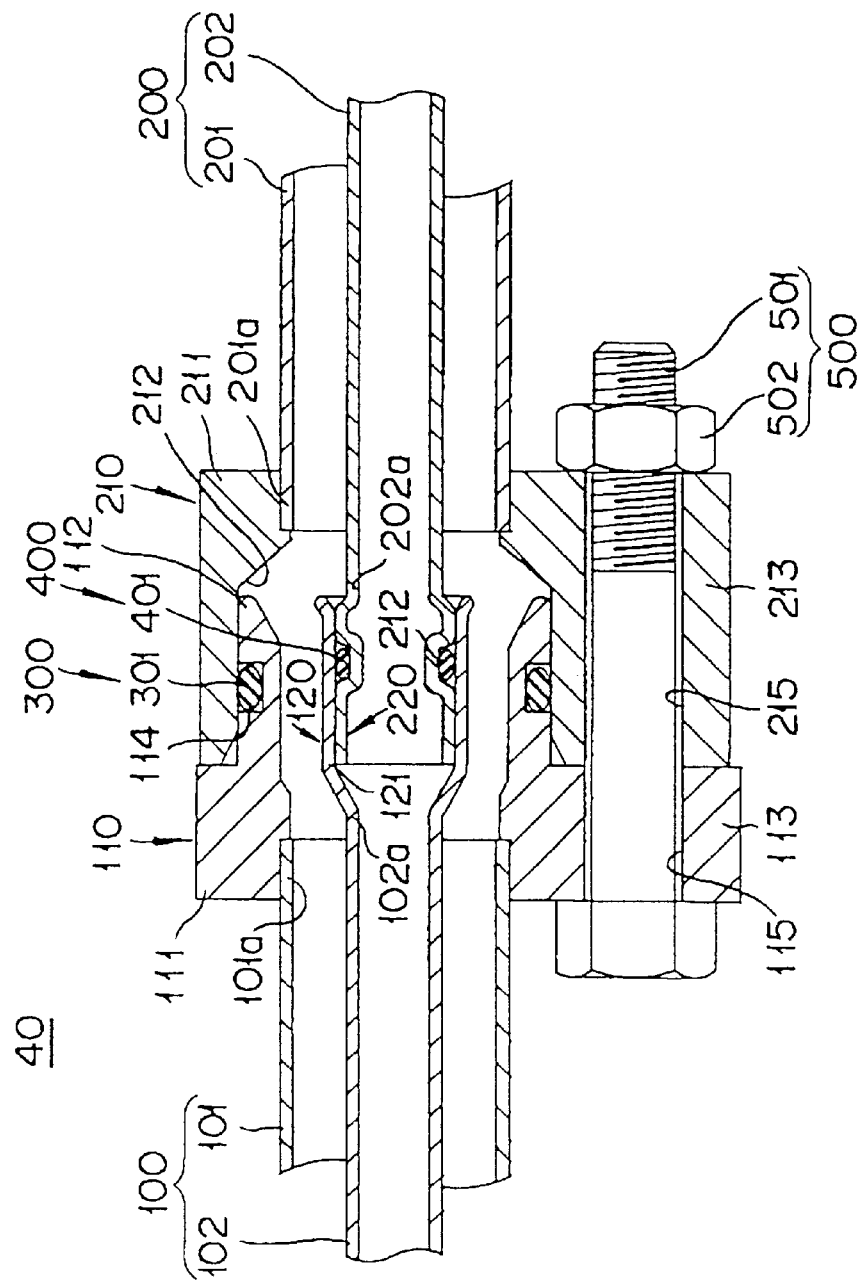

JOINT FOR DUPLEX PIPES

BACKGROUND OF THE INVENTION

1. Field of the invention

The present invention relates to a joint for connecting two duplex pipes each including an outer pipe and an inner pipe therein.

2. Description of the Related Art

As is well known, a duplex pipe is provided with an outer pipe for passing a first fluid and an inner pipe provided inside the outer pipe and for passing a second fluid. Being classified by manufacturing methods, there are two types of duplex pipes.

One type of a duplex pipe is made according to the following steps: the outer pipe and the inner pipe are prepared separately, and the inner pipe is inserted into the outer pipe; the outer pipe is squeezed so that projections formed on the inside wall of the outer pipe are pressed onto the surface of the outer wall of the inner pipe.

The other type is a duplex pipe made by integrally forming an outer pipe, an inner pipe and connecting ribs to connect the outer pipe and the inner pipe by extruding or drawing. In recent years, the duplex pipe of the latter type which integrally forms the outer pipe, the inner pipe and the connecting ribs is widely used in order to reduce the manufacturing costs.

In either of the types, a joint is necessary for connecting two duplex pipes, and the joint for duplex pipes requires to facilitate the connection work and reliability for preventing leakage.

SUMMARY OF THE INVENTION

Accordingly, it is an object of the present invention to provide a joint for duplex pipes that facilitates connecting work and achieves reliability in preventing leakage.

The object of the present invention is achieved by the following joints.

There is provided a joint for connecting a first duplex pipe to a second duplex pipe, each of the first and second duplex pipes including an outer pipe for passing a first fluid, and an inner pipe disposed inside the outer pipe, the inner pipe for passing a second fluid, the joint comprising:

a first outer pipe seal unit attached to an end of the outer pipe of the first duplex pipe;

a second outer pipe seal unit attached to an end of the outer pipe of the second duplex pipe;

a first inner pipe seal portion formed on an end of the inner pipe of the first duplex pipe;

a second inner pipe seal portion formed on an end of the inner pipe of the second duplex pipe;

a first sealing member disposed between the first outer pipe seal unit and the second outer pipe seal unit, the sealing member for sealing the outer pipes to prevent leakage of the first fluid;

a second sealing member disposed between the first inner pipe seal portion and the second inner pipe seal portion, the sealing member for sealing the inner pipes to prevent leakage of the second fluid; and a connection structure for connecting the first and second duplex pipes, under a condition that the first sealing member is disposed between the first outer pipe seal unit and second outer pipe seal unit, and the second sealing member is disposed between the first inner pipe seal portion and the second inner pipe seal portion, wherein a clearance between the first outer pipe seal unit and the second outer pipe seal unit is defined larger than a clearance between the first inner seal portion and the second inner pipe seal portion.

According to the invention, the first inner seal portion may be engaged with the second inner pipe seal portion.

According to the invention, the first sealing member and the second sealing member may be O-rings.

According to the invention, the radial thickness of the O-ring for the outer pipes may be larger than that of the O-ring for the inner pipes.

According to the invention, the hardness of the O-ring for the outer pipes, may be lower than that of the O-ring for the inner pipes.

According to the invention, one of the inner pipes may define a groove for accomodating the O-ring.

According to the invention, one of the first outer pipe seal unit and the second outer pipe seal unit may define a groove for accomodating the O-ring.

According to the invention, a bolt and a nut may form the connection structure.

According to the invention, the bolt may be inserted into the first outer pipe seal unit and the second outer pipe seal unit to fix the first outer pipe seal unit to the second outer pipe unit.

According to the invention, the first outer pipe seal unit may have a union nut portion and the second outer pipe seal unit may have a unit bolt portion engaged with the union nut of the first outer pipe seal unit to form the connection structure with the union nut portion and the union bolt portion.

BRIEF EXPLANATION OF THE DRAWINGS

FIG. 2 is a cross-sectional view showing a joint for duplex pipes shown in FIG. 1.

DETAILED DESCRIPTION OF THE PRESENT INVENTION

The present invention will be described with reference to the drawings.

Figure 1:
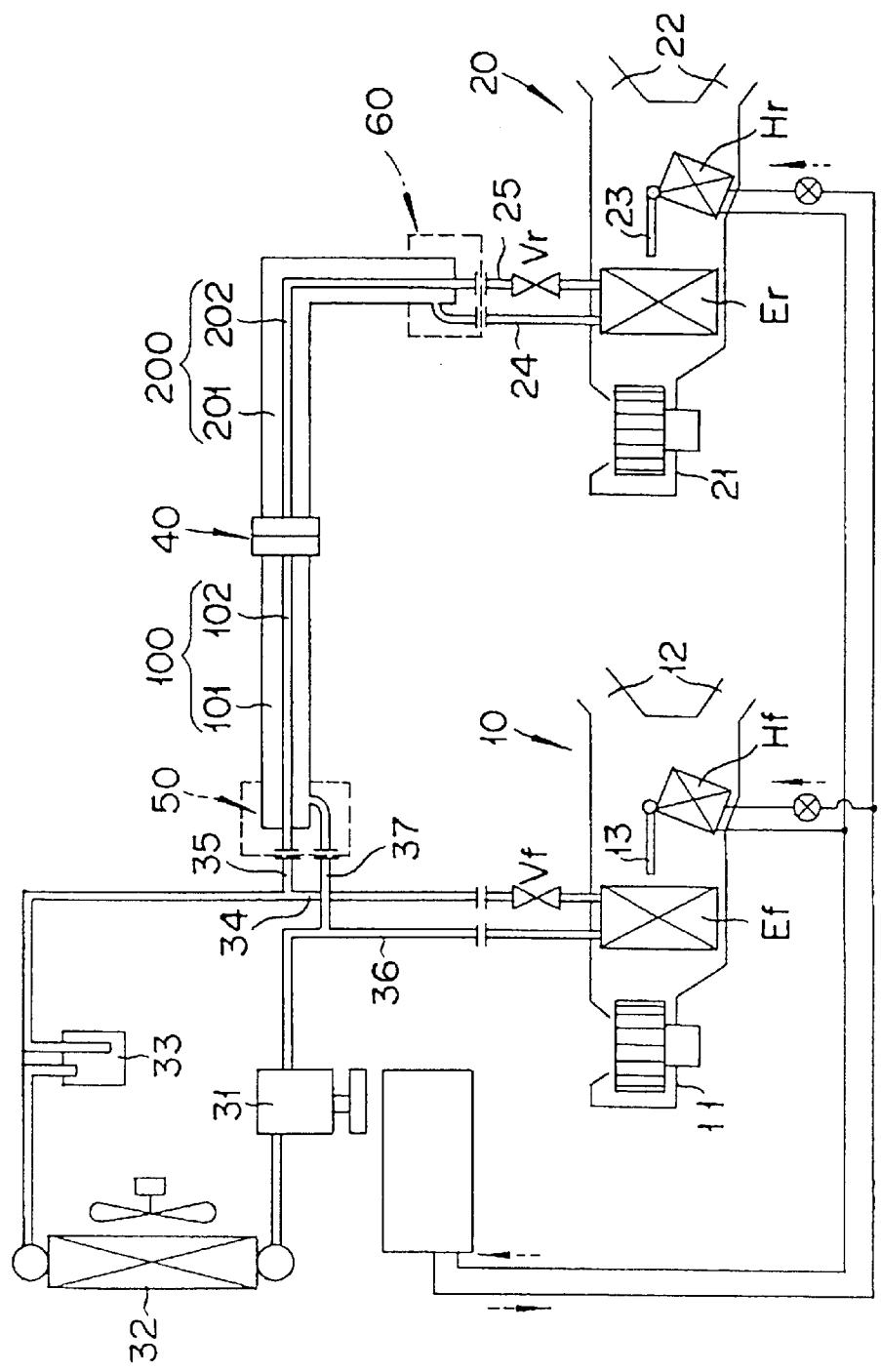
FIG. 1 is a schematic diagram showing an air conditioner for automobiles according to an embodiment of the invention.
Figure 3B:
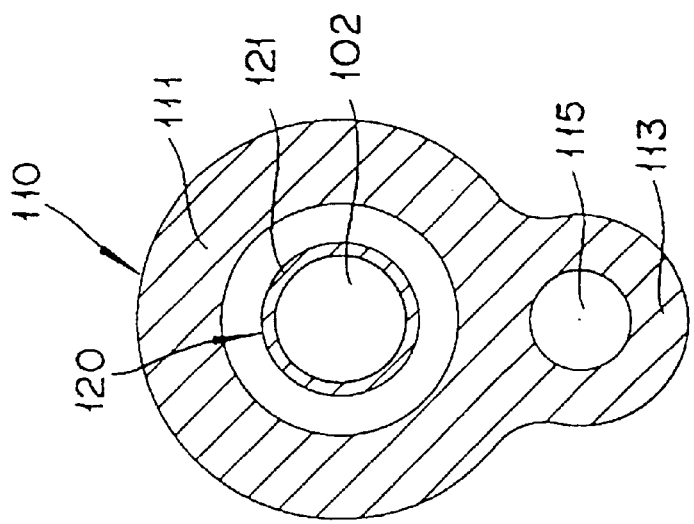
FIGS. 3A and 3B are a cross-sectional view showing the structure of the end portion of one duplex pipe shown in FIG. 2 and a cross-sectional view taken on line 3B—3B.
Figure 3A:
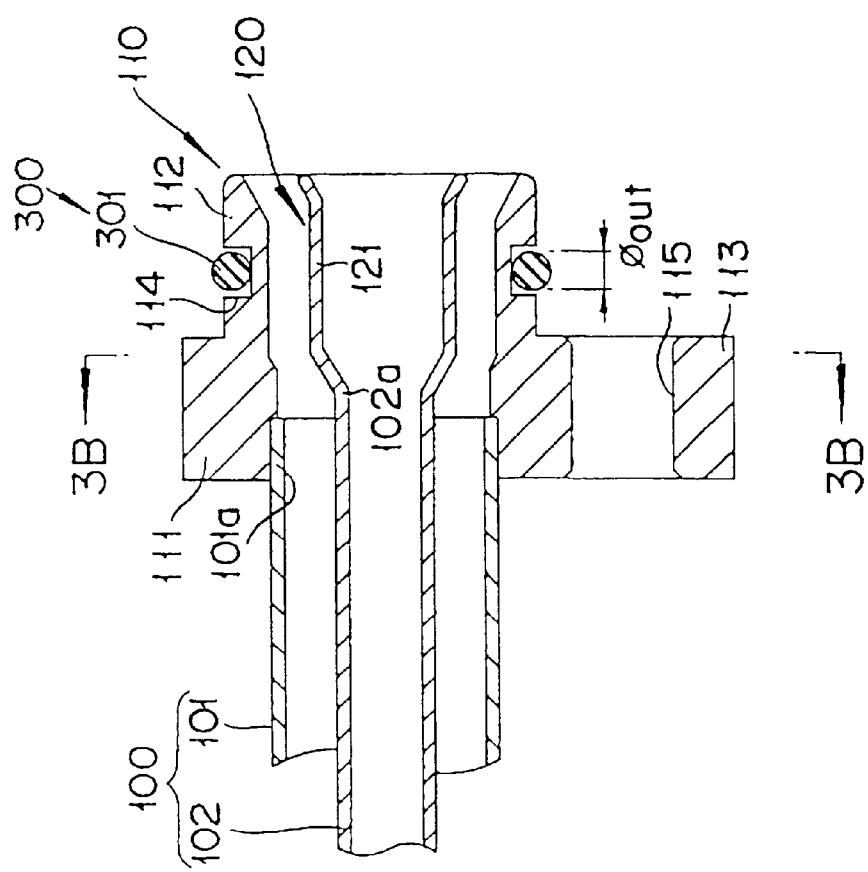
Figure 4A:
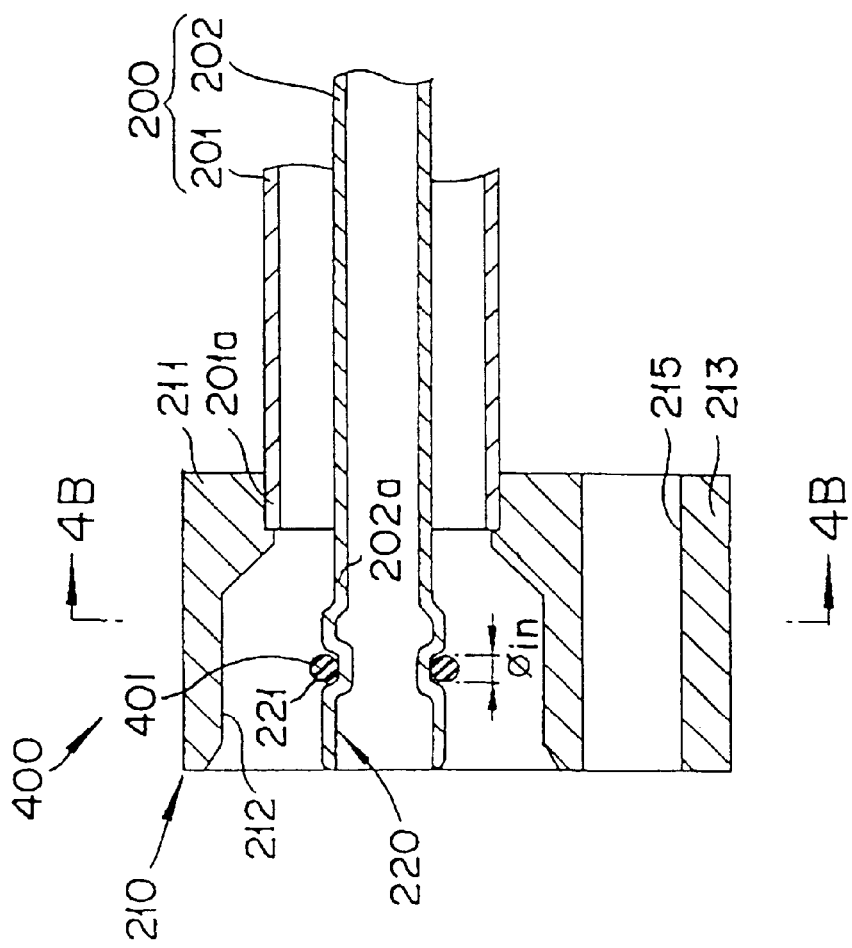
FIGS. 4A and 4B are a cross-sectional view showing the structure of the end portion of the other duplex pipe shown in FIG. 2 and a cross-sectional view taken on line 4B—4B.
Figure 4B:
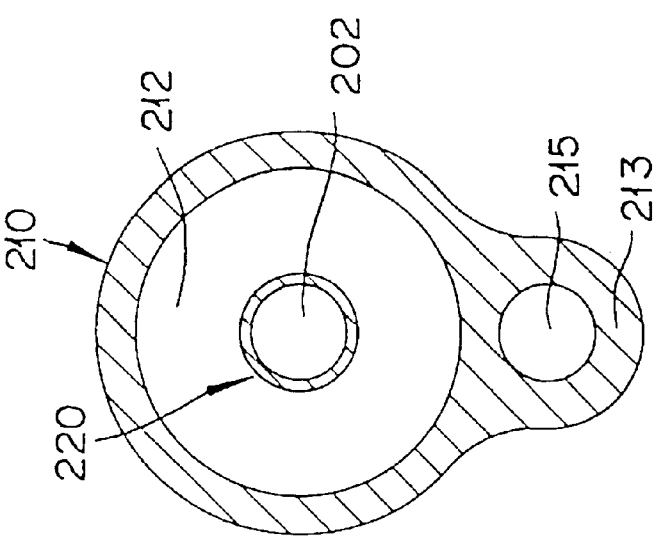
Figure 5:
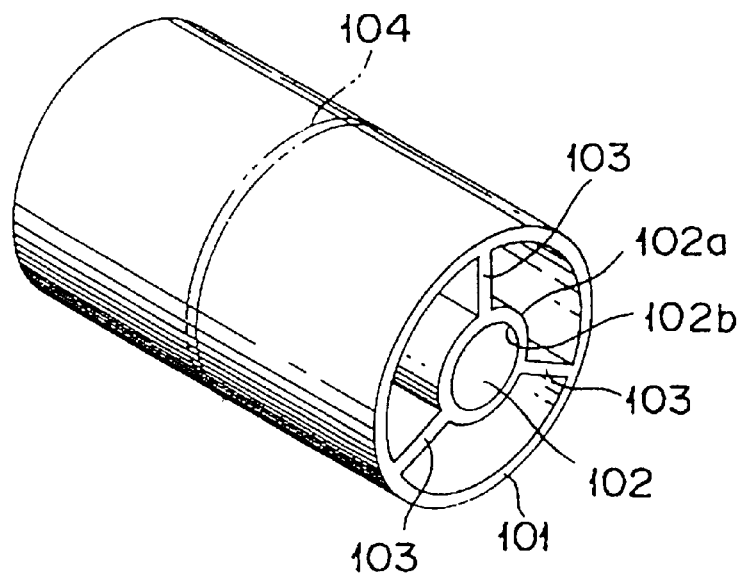
FIG. 5 is a perspective view of a duplex pipe.

FIG. 1 is a schematic diagram showing an air conditioner for automobiles related to an embodiment in which the joint for duplex pipes according to the present invention is applied; FIG. 2 is a cross-sectional view of the joint for the duplex pipes shown in FIG. 1; FIGS. 3A and 3B are cross-sectional views showing the structure of the end portions of one of the duplex pipes shown in FIG. 2 and a cross-sectional view taken along line 3B—3B in FIG. 2; FIGS. 4A and 4B are a cross-sectional views showing the end portion of the other duplex pipe shown in FIG. 2 and a cross-sectional view taken along line 4B—4B in FIG. 2; and FIG. 5 is a perspective view of the duplex pipe.

The air conditioner for automobiles shown in FIG. 1 is a dual-type air conditioner used in so-called one-box cars etc., and there are provided an air conditioner 10 for mainly conditioning atmosphere around the front seat, and another air conditioner 20 for the rear seat. The air conditioner 20 for the rear seat is installed in the center or near the rear part within a passenger room. In the respective air conditioners 10 and 20 for the front seat and the rear seat, air taken in through intake units 11 and 21 is led to unit cases, and cooled by passing through evaporators Ef and Er within the unit cases, and the cooled air is heated by heater cores Hf, Hr or led to bypass the heater cores Hf, Hr, and then mixed with the aforethe heated air to make a warm air at a specific temperature before being blown out into the passenger room. In front of the heater cores Hf, Hr, mix doors 13 and 23 are rotatably attached in order to divide the cooled air into two portions at a specific ratio, namely the air current that passes through the heater cores Hf, Hr, and the air current that bypasses the heater cores Hf, Hr.

As well known, "the evaporators Ef and Er" function to cool the intake air by exchanging heat with a coolant which passes through the inside of the evaporators. Expansion valves Vf, Vr respectively reduces apressure to make the coolant having low temperature and low pressure.

"The heater cores Hf, Hr" function to heat the intake air by exchanging heat with heated cooling water for engine(s) which passes through the inside of the equipments.

The front evaporator Ef, the rear evaporator Er, a compressor 31, a condenser 32, a liquid tank 33, the expansion valves Vf, Vr are connected through coolant lead pipes to form a cooling cycle. The liquid coolant at relatively high temperature and under high pressure flows out of the liquid tank 33 and is led to the front evaporator Ef and the rear evaporator Er through the coolant lead pipes 34, 35 branched in the engine room. And gaseous coolant at relatively low temperature and under low pressure flows out of the front evaporator Ef and the rear evaporator Er respectively and passes through coolant lead pipes 36 and 37 and join together in the engine room before being sucked into the compressor 31.

In the embodiment, duplex pipes are used as coolant lead pipes for connecting the rear evaporator Er with the cooling cycle. The duplex pipes comprise the first duplex pipe 100 to be connected to the coolant lead pipes 35, 37 and the second duplex pipe 200 to be connected to there are vaporator Er. Those two duplex pipes 100, 200 are connected with each other via a joint 40 for duplex pipes. And the low-pressure gaseous coolant (corresponding to the first fluid) flows through the outer pipes 101, 201, while the high-pressure liquid coolant (corresponding to the second fluid) from the liquid tank 33 flows through the inner pipes 102, 202. At the end portion of the first duplex pipe 100, the outer pipe 101 is connected to the coolant lead pipe 37 and the inner pipe 102 to the coolant lead pipe 35 respectively by a joint 50. At the end portion of the second duplex pipe 200, the outer pipe 201 is connected to the outlet pipe 24 of the rear evaporator Er, and the inner pipe 202 to the expansion valve inlet pipe 25 respectively via the joint 60.

The first duplex pipe 100, as shown in FIG. 5, is integrally molded or drawn out of an aluminum material and is formed of an outer pipe 101, an inner pipe 102 and connecting ribs 103 for connecting the outer pipe 101 and the inner pipe 102. The outside diameter of the outer pipe 101 is φ16 to 25 mm while the outside diameter of the inner pipe 102 is about φ6 to 12 mm. The connecting ribs 103 are provided in such a way as to radiially divide the space formed between the outer pipe 101 and the inner pipe 102 into three separate spaces. Since three connecting ribs 103 are present, the axial bending balance is asured, which provides higher degree of freedom on bending design. The second duplex pipe 200 is formed similarly, and will not be explained in detals.

When the duplex pipes 100, 200 are used as coolant lead pipes for connecting the rear evaporator Er with the cooling cycle, the following advantages are offered over separately providing each of the coolant lead pipe for a low-pressure coolant and another coolant lead pipe for a high-pressure coolant. That is, since the bending stiffness becomes higher, restrictions such as bending rate in manufacture are relieved, and consequently the productivity is improved. A conventional pair of pipelines can now be replaced with one single pipe which is manufactured by substantially about half number of machining steps including bending, which reduces the processing costs. Since the stiffness becomes higher, the pipe is hard to be deformed during transport or mounting operations on the car body, and furthermore since it is unnecessary to fix one coolant lead pipe to the other coolant lead pipe utilizing a bracket, the cost is reduced and also the workability in mounting the pipe on the car body is improved.

Next, the configuration of the joint 40 for duplex pipes will be explained.

As shown in FIG. 2, the joint 40 for duplex pipes is classified as a joint of the flange type and, in essence, has a first outer pipe seal unit 110 mounted on the outer pipe end portion 101a of the first duplex pipe 100, a second outer pipe seal unit 210 mounted on the inner pipe end portion 102a of the second duplex pipe 200, a first inner seal portion 120 formed on the inner pipe end portion 102a of the first duplex pipe 100, a second inner pipe seal portion 220 formed on the inner pipe end portion 202a of the second duplex pipe 200, a seal member 300 for the outer pipe disposed between the first outer pipe seal unit 110 and the second outer pipe seal unit 210 to prevent leakage of low-pressure gaseous cooling medium, and a sealing member 400 for the inner pipe disposed between the first inner seal portion 120 and the second inner pipe seal portion 220. Furthermore, with the sealing member 300 for the outer pipe placed between the first outer pipe seal unit 110 and the second outer pipe seal unit 210 and with the sealing member 400 for the inner pipe disposed between the first inner seal portion 120 and the second inner pipe seal portion 220, the joint 40 for duplex pipes has a connection structure 500 for connecting two duplex pipes 100, 200.

The first inner seal portion 120 has such a configuration as to be in engagement with the second inner pipe seal portion 220. The sealing member 300 for the outer pipe includes an O-ring 301, and the sealing member 400 for the inner pipe also includes an O-ring 401. In the example shown, the connection structure 500 is formed of a through bolt 501 and a nut 502.

And in this joint 40 for duplex pipes, the clearance between the first outer pipe seal unit 110 and the second outer pipe seal unit 210 is defined as larger than that existing between the first inner seal portion 120 and the second inner pipe seal portion 220.

To be more specific, the first outer pipe seal unit 110, as shown in FIGS. 3A and 3B, has a base 111 to be soldered to the outer pipe end portion 101a, an annular projection 112 protruding from the base 111 and a flange 113 continuously provided on the lower side in the drawing of the base 111. Around the outer circumferential surface of the annular projection 112, there is formed a ring groove 114 in which the O-ring 301 is inserted. Meanwhile, the second outer pipe seal unit 210, as shown in FIGS. 4A and 4B, has a base 211 to be soldered to the outer pipe end portion 201a, an annular depression 212 defining a depressed part in the base 211, and a flange 213 continuously provided on the lower side in the drawing of the base 211. The annular projection 112 is fit into the annular depression 212. Furthermore, in each of the flanges 113, 213, there are formed openings 115, 215 into which a through bolt 501 is penetrated.

The first inner seal portion 120, as shown in FIG. 3A, has an widened flared portion 121. This flared portion 121 is formed by flaring the inner pipe end portion 102a by punching. Meanwhile, the second inner pipe seal portion 220, as shown in FIG. 4A, has a ring groove 221 formed to insert the O-ring 401 for the inner pipe. The ring groove 221 is formed by punching or rolling the inner pipe end portion 202a. With the flared portion 121 of the first inner seal portion 120 is mated the second inner pipe seal portion 220. The length of the first inner seal portion 120 is defined as such a manner that its farthermost edge does not protrude out of the end edge of the first outer pipe seal unit 110, and the length of the second inner pipe seal portion 220 is also defined as such a manner that its farthermost edge does not protrude out of the end edge of the second outer pipe seal unit 210.

Meanwhile, if there is no deviation in concentricity between the first outer pipe seal unit 110 and the first inner seal portion 120 and there is no deviation in concentricity between the second outer pipe seal unit 210 and the second inner pipe seal portion 220, it is possible to furnish the same degree of clearance between the first outer pipe seal unit 110 and the second outer pipe seal unit 210 as that between the first inner seal portion 120 and the second inner pipe seal portion 220.

However, deviation may occur in machining the outer pipe end portions 101a, 201a or the inner pipe end portion 102a, 202a and in soldering the outer pipe seal units 110, 210, and it is virtually impossible to bring the deviation in concentricity to zero. Therefore, if both the aforethe clearances are defined as equal, problems may be raised that while an engagement of the first inner seal portions 120, 220 is possible, the engagement of the first outer pipe seal unit 110 with the mating end portion 210 becomes unsuccessful, or, reversely, while the engagement of the first outer pipe seal units 110 with the mating end portion 210 is possible, the engagement of the first inner seal portions 120 with mating end portion 220 becomes unsuccessful, or both the engagements of the first inner seal portion 120 with mating seal portion 220 and the engagements of the first outer pipe seal unit 110 with mating seal unit, 210 become impossible.

In the present embodiment, therefore, as described before, the clearance between the outer pipe seal units 110 and 210 is defined larger than that of the inner seal portions 120, 220 by a specific distance so that the differences in concentricity caused in the respective duplex pipes 100, 200 between the outer pipe seal units 110 and 210 and between the inner seal portions 120 and 220 can be absorbed by larger clearance between the outer pipe seal unit 110 and 210. The above described specific distance can be defined as desired, for example, at about 0.2 mm.

Furthermore, it is desirable that as the clearance between the outer pipe seal units 110 and 210 incleases, the wire diameter ($\phi$ out) of the O-ring 301 for the outer pipe becomes larger than the wire diameter ($\phi$ in) of the O-ring 401 for the inner pipe so as to reduce the range of compression rate of the O-ring 301 for the outer pipe.

When the wire diameter ($\phi$ out) of the O-ring 301 for the outer pipe becomes larger, it is conceivable that the workability would decrease in inserting into the annular depression 212 the annular projection 112 with the O-ring 301 for the outer pipe placed therein. In such a case, therefore, it is desirable that the hardness of the O-ring 301 for the outer pipe is set lower than the hardness of the O-ring 401 for the inner pipe so that insertion of the O-ring 301 for the outer pipe is facilitated due to elastical deformation.

The operation will be explained.

When connecting the first duplex pipe 100 and the second duplex pipe 200 to each other, firstly while the annular projection 112 of the first outer pipe seal unit 110 has been brought into engagement with the annular depression 212 of the second outer pipe seal unit 210, the second inner pipe seal portion 220 is mated with the flared portion 121 of the first inner seal portion 120. After both the outer pipe seal unit 110, 210 and the inner seal portions 120, 220 are mated, the O-ring 301 for the outer pipe is placed between the first outer pipe seal unit 110 and the second outer pipe seal unit 210, and the O-ring 401 for the inner pipe is placed between the first inner seal portion 120 and the second inner pipe seal portion 220 as well. Then, the through bolt 501 is inserted into the ports 115, 215 on the respective flanges 113, 213, and the nut 502 is screwed up, completing the connecting of the two duplex pipes 100, 200.

Here, since the concentricity deviation present in the duplex pipes 100, 200 existing between the outer pipe seal units 110 and 210 and between the inner seal portions 120 and 220 is tolerated by the clearance between the outer pipe seal unit 110, 210 set larger than the clearance between the inner seal portion 120 with, 220, it is easy to mate the inner seal portions 120 with 220 and the outer pipe seal units 110 with 210. Furthermore, since the wire diameter ($\phi$ out) of the O-ring 301 for the outer pipe is defined larger than the wire diameter ($\phi$ in) of the O-ring 401 for the inner pipe, the rate of compression of the O-ring 301 for the outer pipe is reduced, the leakage through the mating surfaces of the outer pipe seal units 110, 210, where the clearance is defined relatively large can be completely prevented.

The joint 40 for duplex pipes is a joint of the flange type. Therefore, because the outer pipes 101, 201 and the inner pipes 102, 202 can be mutually connected to simultaneously by one tightening step of tightening 502 on the through bolt 501, the procedures for connecting the two duplex pipes 100, 200 are simplified. The place where leakage could be caused is only one place between the outer pipe seal units 110, 210, and thus the reliability in preventing leakage rises. Furthermore, as welding becomes unnecessary the possible occurrence of the coolant leakage due to faulty welding practice is eliminated and the reliability in preventing leakage is further increased.

Since the inner pipes 102, 202 function as passageway for the high-pressure cooling medium and the outer pipes 101, 201 are intended as passageway for the low-pressure cooling medium, a passageway on the low-pressure side which requires a relatively large sectional area can be secured easily. In addition, since heat exchange readily takes place between the high-temperature, high-pressure cooling medium leading to the expansion valve Vr and the low-temperature, low-pressure cooling medium flowing out of the rear evaporator Er, the temperature of the cooling medium leading to the expansion valve Vr become lowered, and the performance of the rear evaporator Er is improved to realize the power saving. Furthermore, because the passageway for the high-pressure cooling medium is located inside, and therefore, even if the pressure rises abnormally and the high-pressure cooling medium leaks from the inner pipes 102, 202, the leaked high-pressure cooling medium is maintained within the outer pipes 101, 201.

Next, the processing of the end of the first duplex pipe 100 will be explained briefly.

Firstly, as shown by the virtual line in FIG. 5, a slit 104 is formed in the outer circumferential surface 102a of the inner pipe 102 along a circumferential line which corresponds to the exposure length of the inner pipe 102 distant from the end of the duplex pipe. Then, the connecting ribs 103 connecting the outer circumferential surface of the inner pipe are cut at the lower ends from the end of the duplex pipe in the axial direction. For this, a cutting tool is used that moves along the axial direction while turning around the inner circumferential surface 102b of the inner pipe as a guide. Since this cutting tool turns around the inner circumferential surface of the inner pipe as guide, it enables to cut the connecting rib 103 in the axial direction while the wall thickness of the inner pipe 102 kept uniform even if the position of the inner pipe 102 is shifted in the radial direction. When the connecting rib 103 has been cut up to the slit 104, the outer pipe 101 and the connecting ribs 103 can be removed from the inner pipe 102 exposing specified part of the inner pipe 102.

During the conventional method of cutting the outer pipe and the connecting ribs from the end of the duplex pipe in the axial direction, burrs are formed at the end portion of the outer pipe after the outer pipe and the inherent part of the connecting ribs is removed, and finishing work is required to remove the burrs. When a slit 104 is cut in advance as described in the embodiment, no burrs are formed at the outer pipe end portion 101a a eliminating redundant finishing work, simplifying the processing work thereby.

Then the exposed inner pipe end portion 102a is flared by punching to form the first inner seal portion 120 having the flared portion 121. The second duplex pipe 200 is processed likewise to have part of the inner pipe 202 exposed, and the inner pipe end portion 202a is punched or rolled to form a second inner pipe seal portion 220 having a ring groove 221.

In the conventional processing method, when the position of the inner pipe is radially shifted, the wall thickness of the exposed inner pipe end portion was not made uniform, and the inner pipe end portion could be cracked in punching operations. Therefore, it was impossible to punch in practice. To the contrary, if the connecting rib 103 is removed by the cutting tool utilizing the inner circumferential surface 102b of the inner pipe as guide as described in the embodiment, the inner pipe 102 is uniform in wall thickness, which permits punching etc. Therefore, the processing of the inner pipe end portions 102a, 202a can be done quickly and in a simple manner as compared with the conventional processing method.

It is understood that the joint 40 for duplex pipes according to the present invention is not limited to the embodiment described herein and that modifications and variations may be made as necessary.

Figure 6:
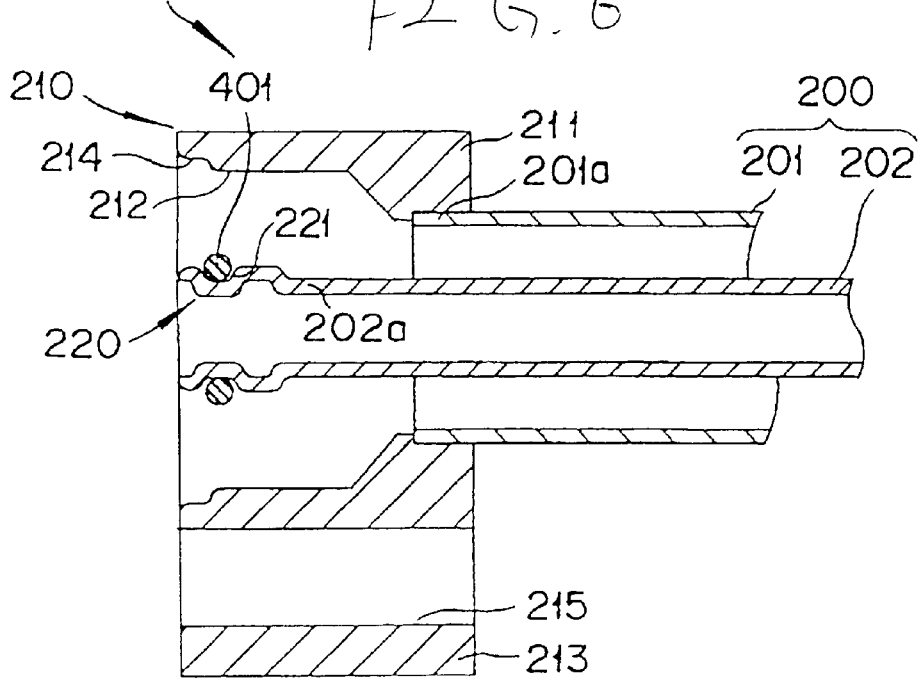
FIG. 6 is a cross-sectional view showing a variation of the joint for duplex pipes of the present invention.

As shown in FIG. 6, it is desirable to form a grooved portion 214 around the inner circumferential surface at the end of the annular depression 212 of the second outer pipe seal unit 210. When the first outer pipe seal units 110, 210 are mated together, the O-ring 301 for the outer pipe is present under a primary compression (temporarily held) in the initial fitting stage. Then, when the two are mated together, the O-ring 301 for the outer pipe lies under a secondary compression (normal fitting). By providing the groove portion 214, it is possible to reduce the inserting force and to prevent the O-ring 301 for the outer pipe from being squeezed in operation.

As is evident by comparing FIGS. 4A to 6, the forming position of the ring groove 221 may be located in the distal end of the inner pipe end portion 202a. That improves workability in fixing or removing the O-ring 401 for the inner pipe on the ring groove 221 located near the end. Furthermore, since it is so arranged that before the O-ring 301 for the outer pipe is compressed, the O-ring 401 for the inner pipe will be compressed, which can disperse the inserting force and improve the inserting workability. In addition, in view of improving the inserting workability, the same can be achieved by slightly increasing the clearance between the first inner seal portion 120 and the second inner pipe seal portion 220 and by increasing wire diameter of the O-ring 401 for the inner pipe.

Figure 7:
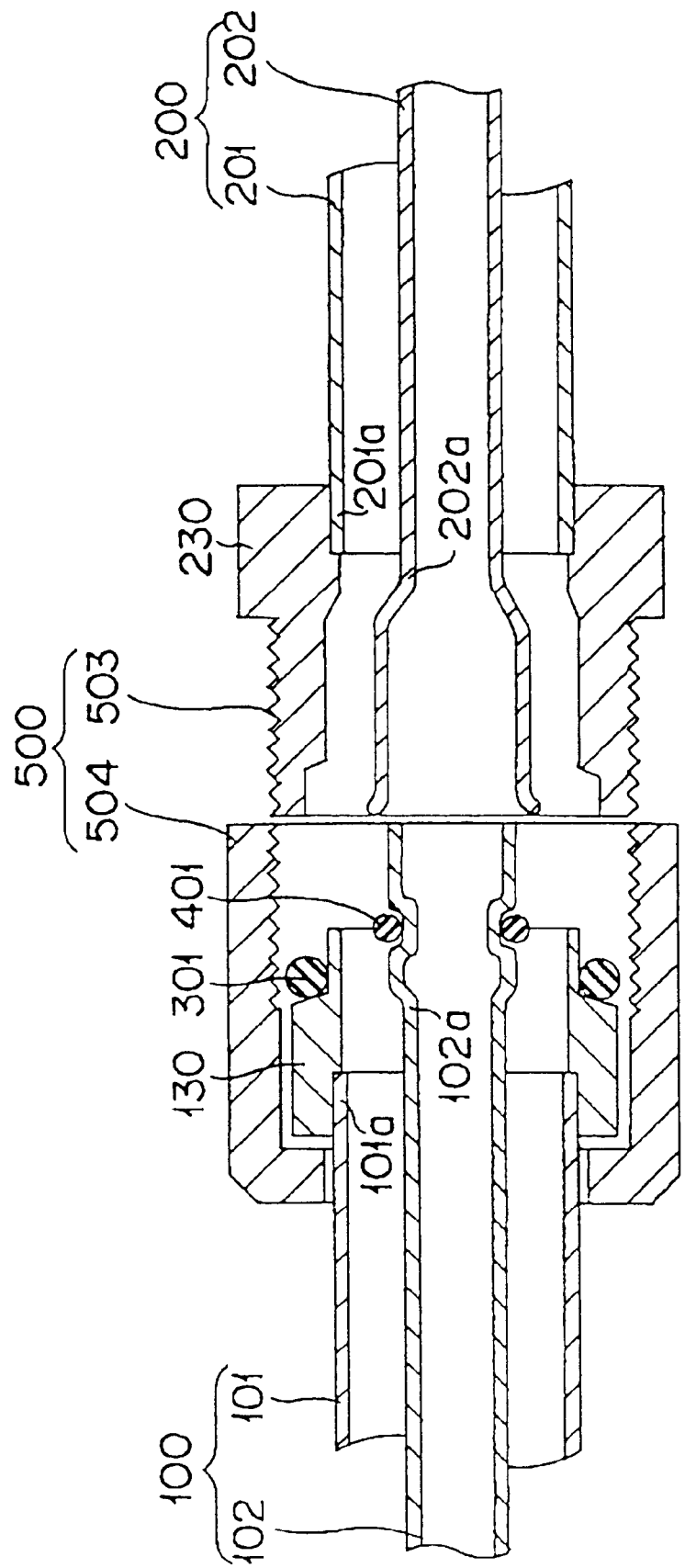
FIG. 7 is a cross-sectional view showing another variation of the joint for duplex pipes of the present invention.

Furthermore, a union-type joint can be obtained as shown in FIG. 7. The joint 41 for duplex pipes has a first outer pipe seal unit 130 holding the O-ring 301 for the outer pipe to be mounted on the outer pipe end portion 101a, a second outer pipe seal unit 230 to be fixed on the outer pipe end portion 201a, a union screw 503 formed on the outer circumferential surface of the second outer pipe seal unit 230 and a union screw 504 inserted in the first duplex pipe 100. In the example shown, a connection structure 500 is includes a union screws 503 and 504 to be connected thereto.

Furthermore, as shown in FIG. 7, both the O-ring 301 for the outer pipe and the O-ring 401 for the inner pipe may be provided in one duplex pipe (in the shown example, on the first duplex pipe 100).

As set forth above, the joint for duplex pipes provides simplified connecting procedure achieving reliability in preventing leakage.

Furthermore, the joint for duplex pipes successfully maintaines the workability in connecting the first and the second outer pipe seal units even if the O-ring, which functions as a sealing member for the outer pipe, is increased in wire diameter.

What is claimed is:

1. A joint for connecting a first duplex pipe to a second duplex pipe, each of the first and second duplex pipes including an outer pipe for passing a first fluid, and an inner pipe disposed inside the outer pipe, the inner pipe for passing a second fluid, the joint comprising;

a first outer pipe seal unit attached to an end of the outer pipe of the first duplex pipe;

a second outer pipe seal unit attached to an end of the outer pipe of the second duplex pipe;

a first inner pipe seal portion formed at an end of the inner pipe of the first duplex pipe;

a second inner pipe seal portion formed at an end of the inner pipe of the second duplex pipe;

a first sealing member disposed between the first outer pipe seal unit and the second outer pipe seal unit, the sealing member for sealing the outer pipes to prevent leakage of the first fluid;

a second sealing member disposed between the first inner pipe seal portion and the second inner pipe seal portion, the sealing member for sealing the inner pipes to prevent leakage of the second fluid; and a connection structure for connecting the first and second duplex pipes, under a condition that the first sealing member is disposed between the first outer pipe seal unit and second outer pipe seal unit, and the second sealing member is disposed between the first inner pipe seal portion and the second inner pipe seal portion, wherein a clearance between the first outer pipe seal unit and the second outer pipe seal unit is defined larger than a clearance between the first inner seal portion and the second inner pipe seal portion, wherein the first inner pipe seal portion is engaged with the second inner pipe seal portion.

2. The joint according to claim 1, wherein the first sealing member and the second sealing member are O-rings.

3. The joint according to claim 2, wherein the radial thickness of the O-ring for the outer pipes is larger than that of the O-ring for the inner pipes.

4. The joint according to claim 2, wherein the hardness of the O-ring for the outer pipes is lower than that of the O-ring for the inner pipes.

5. The joint according to claim 2, wherein one of the inner pipes defines a groove for accomodating the O-ring.

6. The joint according to claim 2, wherein one of the first outer pipe seal unit and the second outer pipe seal unit defines a groove for accomodating the O-ring.

7. The joint according to claim 1, wherein a bolt and a nut form the connection structure.

8. The joint according to claim 7, wherein the bolt is inserted into the first outer pipe seal unit and the second outer pipe seal unit to fix the first outer pipe seal unit to the second outer pipe unit.

9. The joint according to claim 1, wherein the first outer pipe seal unit has a union nut portion and the second outer pipe seal unit has a unit bolt portion engaged with the union nut of the first outer pipe seal unit to form the connection structure with the union nut portion and the union bolt portion.

10. The joint according to claim 1, wherein said second sealing member is radially interposed between said first inner pipe seal portion and said second inner pipe seal portion.

11. The joint according to claim 1, wherein said first inner pipe seal portion and said second inner pipe seal portion axially overlap one another.

* * * * *